No. 685,704. Patented Oct. 29, 1901.
M. C. WILKINSON.
DEVICE FOR CONTROLLING THE USE OF COMPRESSED AIR.
(Application filed July 15, 1899.)
(No Model.)
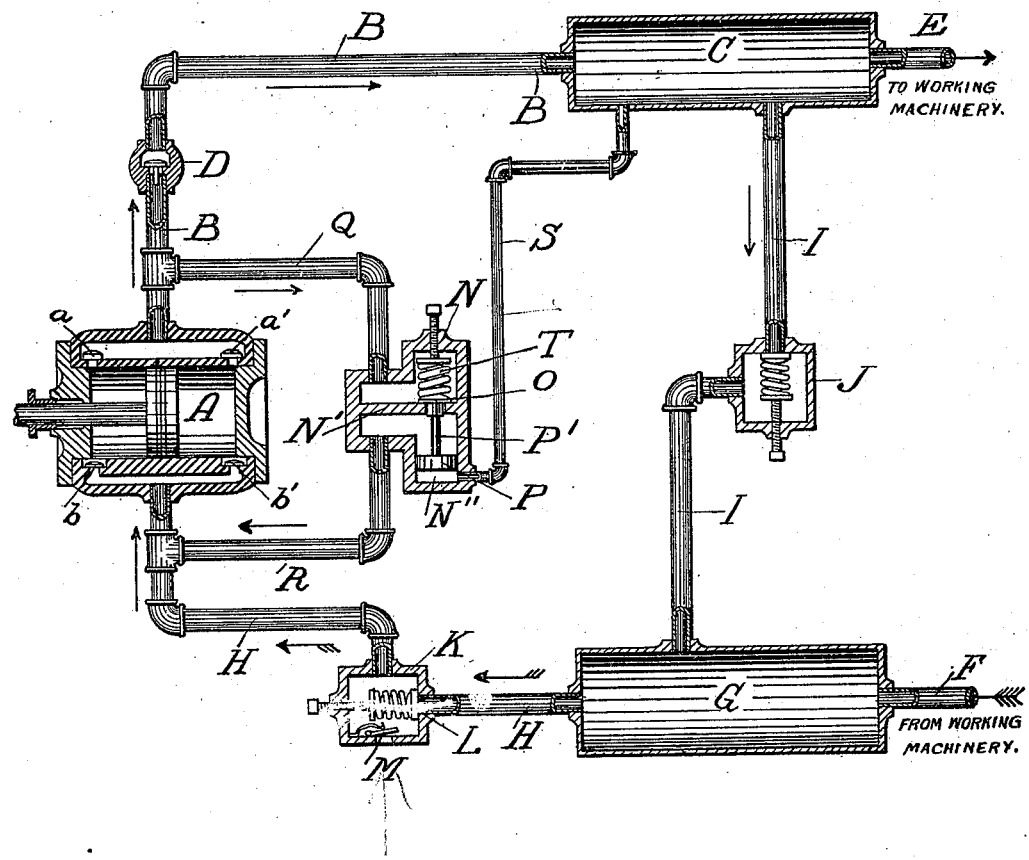
WITNESSES
INVENTOR
M. C. Wilkinson
By Hazard & Horpham
ATTORNEYS.

UNITED STATES PATENT OFFICE.

MELVILLE C. WILKINSON, OF LOS ANGELES, CALIFORNIA.

DEVICE FOR CONTROLLING THE USE OF COMPRESSED AIR.

SPECIFICATION forming part of Letters Patent No. 685,704, dated October 29, 1901.

Application filed July 15, 1899. Serial No. 724,000. (No model.)

*To all whom it may concern:*

Be it known that I, MELVILLE C. WILKINSON, a citizen of the United States, residing at the city of Los Angeles, county of Los Angeles, State of California, have invented new and useful Improvements in Apparatus for Recompressing, Conveying, and Distributing Compressed Air as a Motive Force, of which the following is a specification.

My invention relates to certain novel modes of controlling the compression, recompression, conveyance, and distribution of air under pressure in that class of machinery in which compressed air is used as a means to transmit motive force to drive machinery more or less distant from the primary source of power in which the exhausted air is recompressed for reuse; and the objects of my improvement are to control the use of compressed air in such manner that the compression machinery may at all times have a constant rate of speed no matter what may be the load on the working machinery, to economize the motive force by using only so much thereof as may be necessary to operate the working machinery, to lighten the power-transmitting mechanism, and to dispense with the cooling-jacket usually employed in machinery in which compressed air is used to transmit motive force. I accomplish these objects by the mechanism described herein and illustrated in the accompanying drawing, which shows my device in section.

In ordinary machines in which exhaust compressed air is recompressed for reuse as a motive force it is necessary, to insure the safety of the compression-cylinders and storage-tank, to vary the speed of the compression machinery to correspond with the load on the working machinery—that is, when the load on the working machinery is light the compression machinery is required to be run at a less rate of speed than when the load on the working machinery is heavy, as there is at such times a less demand for energy. When more energy is required, it becomes necessary to speed up the compression machinery before it can be supplied, and thereby a considerable loss of time is occasioned, which renders such motive force objectionable when the load varies—as, for instance, in stopping and starting street-cars. In my improved apparatus this objection is obviated, as I am enabled to run the compression machinery at all times at a constant maximum rate of speed which will produce the greatest efficiency, and thereby no loss of time is occasioned to change from a minimum to the maximum load.

In the drawing, A is the cylinder of the air-compressor, which is of ordinary construction and is operated by any suitable mechanism. (Not shown.) Cylinder A is fitted with discharge-valves *a a'* and suction-valves *b b'* and is connected with high-pressure reservoir C by pipe B, in which is located check-valve D to prevent the return of air from reservoir C.

E is a pipe leading from reservoir C to the working machinery. (Not shown.)

F is a pipe through which the exhaust compressed air is delivered into the low-pressure reservoir G, which is connected with cylinder A by low-pressure pipe H through the suction-valves *b b'*. On pipe H is valve-chamber K, in which is located an adjustable puppet-valve L to control the passage of air therethrough, and also flap-valve M, which controls the admission of air from the atmosphere into valve-chamber K.

I is a pipe connecting reservoirs C and G, in which is located an adjustable puppet-valve J to prevent under ordinary conditions the passage of air from reservoir C through pipe I into reservoir G.

N is a pressure-controlled by-pass and is divided by the horizontal partition or web N' into an upper and lower compartment. It has an opening therethrough, affording communication between the upper and lower compartments. In the upper compartment is an adjustable puppet-valve O, having its seat on the partition or web N', and controls the communication between the upper and lower compartments of the chamber. This valve is held on its seat by the spring T. Working in the depression in the lower compartment of chamber N is the piston P, having stem P', the elevation of which will open the valve O, and the spiral spring T will close it. This by-pass is connected as follows: Leading from the bottom piston-chamber N'' and connecting with the reservoir C is the pipe S. Leading from the upper compartment in the chamber and connecting with the pipe B is the pipe Q. Leading from the lower compartment above the piston P and connecting with the pipe H is the pipe R.

Assume that air is compressed to two hundred pounds pressure by compressor A, at which pressure it passes from A into reservoir C, from which it is fed into the motor (not shown) through E, and that it is discharged from the motor-exhaust into reservoir G through pipe F at a pressure of one hundred pounds. It will thus be seen that to operate the working machinery one hundred pounds of pressure has been used. Now if one hundred pounds of pressure is exhausted in operating the machinery it follows that puppet-valves J and O should be adjusted to a pressure a little in excess of one hundred pounds—say J at one hundred and three pounds, and O at one hundred and one pounds—in order that the compressed air shall be delivered to the working machinery. Compressor A, being operated by the initial motive power, pumps the air out of reservoir G and again compresses it and returns it into reservoir C. This is the operation of all air motive mechanism of this type of which I am aware. Now assume that the load is reduced so that fifty pounds of pressure will operate the machinery instead of one hundred pounds, as before. In ordinary machines this requires a diminution of the speed of the mechanism driving the air-compressor. In my device this is not the case. As soon as the air-pressure in the reservoir C reaches a point a little in excess of two hundred and one pounds the pressure of the air on the lower side of piston P causes it to open valve O, and communication is thereby established between pipes B and H through pipes Q and R and chamber N, and the compressor then receives into and forces out of its air-compression chamber air of the same density, and continues so to do as long as the communication is maintained. It will be observed that there is the same amount of pressure on the upper surface of valve O and on the lower surface of piston P; but piston P having a much greater area than valve O having the pressure on the lower surface of piston P will cause it to open valve O, whereupon communication is immediately established between Q and R, permitting the air to idle therethrough. Check-valve D prevents the air from escaping through pipe B from reservor C, and air continues to be fed from reservoir C to the working machinery until the pressure therein is so reduced that valve O closes. This enables the compressor to be run at the same rate of speed with a minimum expenditure of initial power. It will also be observed that the pressure of valve L should be a little less than the pressure of the exhaust-air in order to keep the pressure in reservoir G uniform and that as long as the air in reservoir G has pressure sufficient to open valve L valve M will remain closed and the compressor will get its supply of air from reservoir G. Should the pressure in reservoir G by reason of leakage fall so low that it would not open valve L, air from the atmosphere will be admitted into chamber K through valve M until the pressure in reservoir G rises high enough to open valve L, when valve M will close and air will again be pumped from reservoir G. This arrangement makes the admission of air from the atmosphere to supply leakage automatic and also enables a supply of air to be admitted to the compressor when first starting. It will be observed that communication between reservoirs C and G by means of pipe I is not necessary as long as the other air-controlling device works and that this by-pass is only an extra safety precaution and may be omitted, if desired. By making pipes E and F sufficiently large they may be used as high and low pressure reservoirs and reservoirs C and G dispensed with.

Having described my invention, what I claim is—

1. In an apparatus for recompressing, conveying and distributing compressed air as a motive force, an air-compressor having high and low pressure ports and valves; a high-pressure pipe connecting said high-pressure port with a high-pressure reservoir; a check-valve in said pipe; a high-pressure air-reservoir; a pipe connecting said high-pressure reservoir with the working machinery; a pipe connecting the exhaust of the working machinery with the low-pressure reservoir; a low-pressure reservoir; a low-pressure pipe connecting said low-pressure reservoir with the low-pressure port of the air-compressor; a valve-chamber on said low-pressure pipe, an adjustable pressure-regulated valve within said chamber adapted to control the passage of the exhaust-air through said low-pressure pipe, a second valve within said chamber adapted to admit atmospheric air into said chamber upon the lowering of the air-pressure in said chamber below a predetermined point; a chamber divided into an upper and lower part by a web, intermediate the high and low pressure pipes, an adjustable regulated pressure-valve in the upper part of said chamber; a piston in the lower part of said chamber having a stem to open the valve in the upper portion of said chamber; a pipe connecting the upper part of said chamber with the high-pressure pipe; a pipe connecting the lower part of said chamber below the piston with the high-pressure reservoir; a pipe connecting the lower part of said chamber above the piston with the low-pressure pipe.

2. In an apparatus for recompressing, conveying and distributing compressed air as a motive force, a device for controlling the use of air, comprising a high-pressure pipe, a low-pressure pipe, a chamber intermediate the high and low pressure pipes divided into two parts by a web having an opening therein; a pressure-regulated valve in said upper part of said chamber, adapted to close the opening in the web of said chamber; a piston in the lower part of said chamber having a stem to open the valve in the upper portion of said chamber, a pipe connecting the lower part of said chamber below said piston with the high-pressure air-pipe; a pipe connecting the lower part of said chamber above the piston with the low-pressure air-pipe; and a pipe connecting the upper part of said chamber with the high-pressure air-pipe, in combination with an air-compressor.

3. In an apparatus for recompressing, conveying and distributing compressed air as a motive force, a device for automatically admitting atmospheric air to supply the loss of air due to leakage, comprising a valve-chamber on the low-pressure air-pipe intermediate the compressor and low-pressure air-reservoir; a pressure-regulated valve in said chamber adapted to control the passage of the air through said low-pressure pipe, a second valve in said chamber adapted to admit atmospheric air into said chamber whenever the pressure therein falls below atmospheric pressure.

4. An air-compressor having a by-pass pipe connecting its discharge and suction ports, a valve-chamber on said by-pass, a pressure-regulated valve therein normally closing the opening through said by-pass, a piston-chamber in said valve-chamber, a piston therein having a stem adapted to open the valve when the pressure in the discharge exceeds a predetermined point, a pipe leading from a point in the piston-chamber below the piston to the discharge-port and adapted, when the pressure reaches a predetermined point in the discharge at which the valve is set, to open the communication in the by-pass and permit the air in the discharge to pass into the suction and to keep said communication open as long as the pressure in the discharge remains above the point at which the valve is set.

5. A device to regulate the communication between the discharge and suction ports of a compressor comprising a valve-chamber having a partition dividing the same into an upper and lower compartment, a pipe leading from one compartment to the discharge-port and another pipe leading from the other compartment to the suction-port; an opening in said partition, a valve adapted to close said opening when seated and open the same when removed therefrom, the said valve being provided with a piston, a separate compartment in said chamber forming a piston-chamber for the reception and working therein of the piston, a pipe leading from a point in said piston-chamber, below the piston, to the discharge-port, a spring adapted to hold the valve closed and to permit it to open when the pressure on the piston reaches a predetermined point, and means to regulate the compression on said spring.

6. In an air-compressing, distributing and utilizing apparatus in which the air is recompressed for reuse, a self-regulating by-pass connecting the discharge with the suction of the compressor, comprising a valve-chamber having a partition dividing the same into two compartments, a pipe connecting one compartment of the chamber with the discharge, and another pipe connecting the other compartment with the suction-port, an opening in said partition the partition surrounding the opening forming a valve-seat, a valve covering said opening, a spring to press said valve against its seat and having means to adjust the pressure thereon, a piston projecting from said valve into a valve-chamber projecting out of said main chamber, said valve-chamber having communication in the rear of the piston with the discharge-port.

7. In an apparatus in which air is recompressed for reuse, a device to replenish the leakage of air in the system comprising a valve-chamber disposed on the pipe connecting the motor-exhaust with the suction-port of the compressor, a clack-valve in said chamber arranged to open and close communication with the atmosphere and admit the air when the pressure in said chamber is below the atmospheric pressure, a spring-pressed valve also in said chamber arranged to close the opening in the chamber leading from the exhaust and adjusted to keep the air therein at a pressure just a little below the pressure at which it is exhausted from the motor.

In witness that I claim the foregoing I have hereunto subscribed my name, this 8th day of July, 1899, at Los Angeles, California.

MELVILLE C. WILKINSON.

Witnesses:
G. E. HARPHAM,
H. T. HAZARD.